SOLID STATE LIGHT AMPLIFIER FOR COLOR

Filed July 17, 1958 2 Sheets-Sheet 1

INVENTOR.
RADAMES K. H. GEBEL
BY Wade Koontz
ATTORNEY and
James S. Shannon
AGENT

SOLID STATE LIGHT AMPLIFIER FOR COLOR

Filed July 17, 1958 2 Sheets-Sheet 2

INVENTOR.
RADAMES K. H. GEBEL
BY Wade Koontz
ATTORNEY
James S. Shannon
AGENT

United States Patent Office 3,005,108
Patented Oct. 17, 1961

3,005,108
SOLID STATE LIGHT AMPLIFIER FOR COLOR

Radames K. H. Gebel, Dayton, Ohio, assignor to the United States of America as represented by the Secretary of the United States Air Force Filed July 17, 1958, Ser. No. 749,307
4 Claims. (Cl. 250—213)
(Granted under Title 35, U.S. Code (1952), sec. 266)

The invention described herein may be manufactured and used by or for the United States Government for governmental purposes without payment to me of any royalty thereon.

This invention relates to light amplifiers employing the principle of electroluminescence and has for its principal object the provision of an amplifier of this type that preserves the color distribution in the original image. Further objects are to provide a light amplifier that permits an examination of the distribution of the individual primary colors in an image and that permits the selective examination of an image as to its light content in the visible portion of the spectrum and its light content in the infrared portion of the spectrum.

Briefly, the light amplifier is made up of a plurality of narrow strips of electroluminescent material placed side by side to provide a flat surface. Provision is made to apply alternating voltages to these strips, the magnitudes of which are controlled by photoconductors subjected to the light of the image to be amplified. The color in the amplified image may be produced by having the electroluminescent elements produce the primary colors directly or the electroluminescent material may produce white light with strip filters used to separate the desired primary colors. Similarly, the photoconductors can be made of materials sensitive to the individual primary colors or a photoconductor having a broad response characteristic may be used with filters to select the primary colors from the incident image. In the embodiment providing selective viewing of the infrared and visible light components of the incident image, alternate electroluminescent strips producing red and either green or blue light are used. The output of the red strips is controlled by infrared radiation only through the use of a suitable infrared sensitive photoconductor, while the output of the green or blue strips is controlled by a photoconductor sensitive to visible light.

Figure 1:
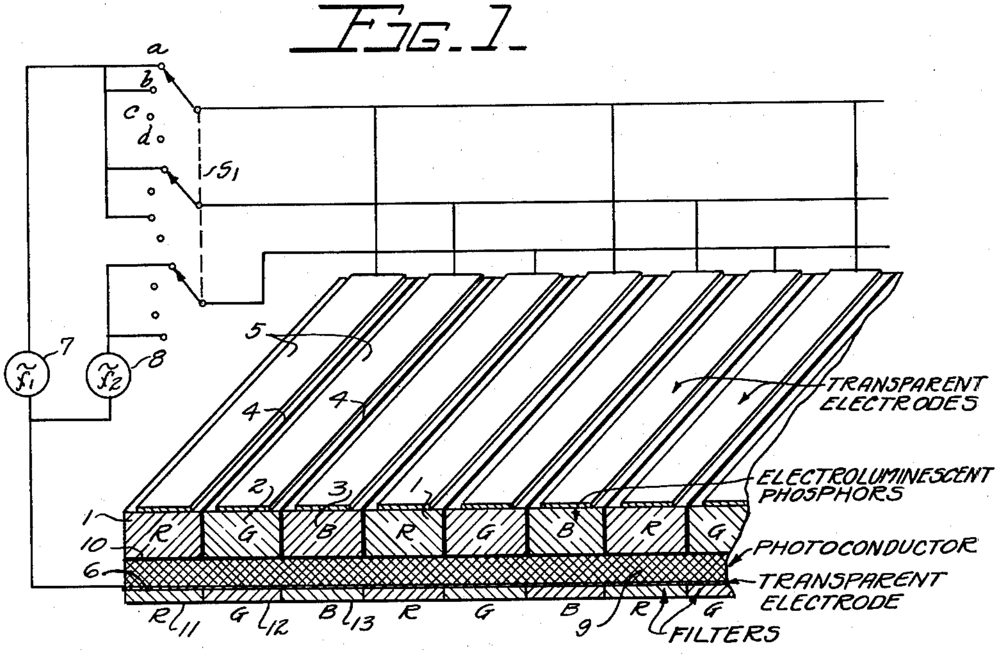
Figure 1A:
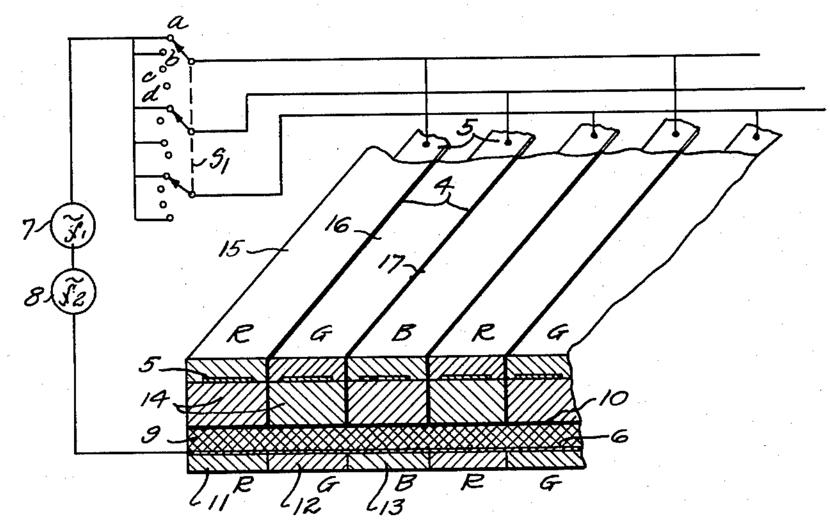
Figure 2:
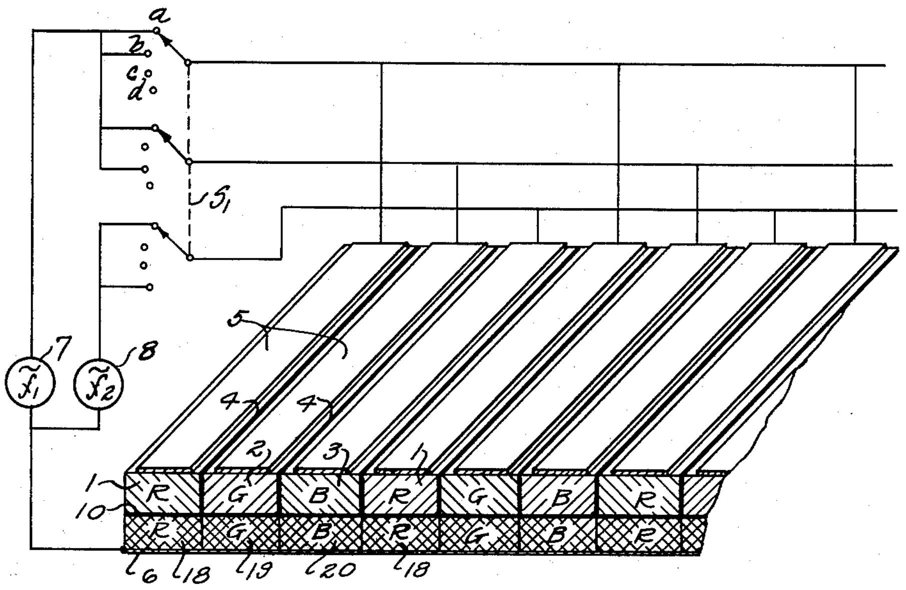
Figure 3:
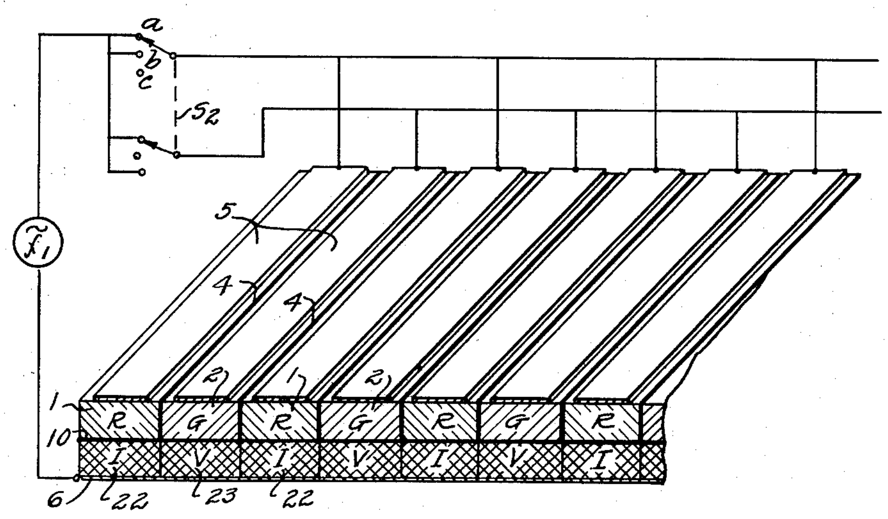

A more detailed description of the invention will be given with reference to the specific embodiments thereof shown in the accompanying drawings in which FIG. 1 is a light amplifier for color utilizing primary color producing electroluminescent phosphors with broad band photoconductive material, FIG. 1*a* is a light amplifier for color similar to FIG. 1 except that white light producing phosphors are used with appropriate filters, FIG. 2 is a light amplifier for color using color producing phosphors and color sensitive photoconductors, and FIG. 3 is a light amplifier permitting selective examination of visible and infrared images.

Referring to FIG. 1, 1, 2 and 3 are narrow strips of electroluminescent material capable of producing, when properly energized, red, green and blue light, respectively. As is well understood in the art, certain phosphors luminesce when subjected to a changing electric field. The usual procedure is to suspend the phosphor in a dielectric material which is situated between two electrodes as in a condenser. When an alternating potential is applied between the electrodes the phosphor luminesces in direct relation to the magnitude of the applied voltage. The wavelength or color of the light produced depends upon the phosphor used and the frequency of the energizing voltage. For example, red light may be produced by a phosphor made of zinc sulphide (ZnS) with selenium (Se) as an impurity and energized at 50 c./s.; green light may be produced by a phosphor made of zinc sulphide (ZnS) with copper (Cu) and lead (Pb) impurities and energized at 50 c./s.; and blue light may be produced with the same phosphor as that used for green light but energized at 500 c./s. The electroluminescent strips 1, 2 and 3 are separated by a thin light barrier 4 which prevents light spillover between adjacent strips and thereby improves resolution. This barrier may be made of any suitable opaque material, conductive or nonconductive, and should be as thin as possible.

The electroluminescent strips 1, 2 and 3 are subjected to alternating electric fields by means of individual transparent electrodes 5 and a single large transparent electrode 6. The electrodes 5 are made somewhat narrower than the electroluminescent strips in order to restrict the electric field to the associated strip. Voltage of one or the other of frequencies $f_1$ and $f_2$, supplied by alternating voltage sources 7 and 8, is applied between each electrode 5 and the electrode 6 through switch $S_1$, the operation of which will be explained later. Situated between the electroluminescent strips 1, 2, 3 and electrode 6 is a layer of photoconductive material 9. This photoconductive material may be cadmium sulphide (CdS), for example, which has a broad sensitivity to light in the visible spectrum. The photoconductor 9 is separated from the electroluminescent strips by a nonconductive light barrier 10 which serves to prevent feedback of light from the phosphor to the photoconductive material. Preferably, this barrier should be as thin as possible and have as high a dielectric constant as possible.

It is apparent that the voltage between electrodes 5 and 6 divides between the electroluminescent strip 1, 2 or 3, the light barrier 10 and the photoconductor 9. By making barrier 10 thin and of high dielectric constant the voltage loss across it may be made insignificant so that substantially the full voltage divides between the photoconductor and the electroluminescent strip. Since the voltage drop across the photoconductor 9 varies with its resistance, a change in photoconductor resistance results in a change in the electric field strength within the electroluminescent strip and a resulting change in its light output.

Filter strips 11, 12 and 13, having the same width and length as electroluminescent strips 1, 2 and 3, are situated directly opposite the latter. The arrangement is such that the color of the light passed by each filter strip is the same as the color of the light produced by the corresponding electroluminescent strip. The conductivity of that part of photoconductor 9 located beneath any filter strip is directly related to the light passing through the filter strip and into the photoconductor.

Considering the operation of the light amplifier shown in FIG. 1, the image to be amplified or incident image is formed on the outer surface of filter strips 11, 12, 13 by any suitable optical system. The limit of resolution of the amplifier is determined by the width of the strips 1, 2, 3 (or 11, 12, 13), the minimum resolvable dimension being equal to three times the strip width. Considering an elemental area in the image having this dimension, the light passing through the red filter 11 is proportional in intensity to the red light in the elemental area, that passing through the green filter is proportional to the green light in the elemental area, and that passing through the blue filter is proportional to the blue light in the elemental area. Consequently, the conductivities of those portions of photoconductor 9 situated beneath the red, green and blue filters in the elemental area are directly related to the intensities of these colors in the elemental area of the image. Since the voltages applied across those portions of electroluminescent strips 1, 2, 3 situated within the elemental area are directly related to these conductivities, the portions of the electroluminescent strips situated within the elemental area produce red, green and blue light in proportion to the intensities of these colors in the elemental area of the incident image. The result is a reproduction of this elemental image area with increased light intensity. In this manner all of the elemental areas of the incident image are reproduced in amplified form, the resulting amplified image being observable by viewing the amplifier surface containing electrodes 5. With switch $S_1$ in position "*a*" alternating voltage of frequency $f_1$ is applied to the electrodes 5 associated with the red and green electroluminescent strips 1 and 2 and a voltage of frequency $f_2$ is applied to the electrode 5 associated with the green strip 3 so that all colors are reproduced. In positions *b*, *c* and *d* of $S_1$ only the electrodes 5 associated with the red, green or blue electro-luminescent strips, respectively, are energized so that the reproduced images show only the red, green or blue content of the incident image as desired. With the phosphors given above, $f_1$ may be 50 c./s. and $f_2$ 500 c./s.

FIG. 1*a* is a modification of FIG. 1 in which the electroluminescent strips 14, which correspond to strips 1, 2, 3 of FIG. 1, are all made of the same white light producing electroluminescent phosphor. The phosphor, for example, may be zinc sulphide (ZnS) with lead (Pb), copper (Cu) and selenium (Se) impurities energized at both 50 c./s. ($f_1$) and 500 c./s. ($f_2$). This requires the use of additional red, green and blue filter strips 15, 16 and 17 to select the proper color from the white light produced by the phosphor. The operation of FIG. 1*a* is otherwise the same as the operation of FIG. 1.

FIG. 2 is another modification of the light amplifier of FIG. 1 which allows filters 11, 12 and 13 to be omitted, the incident image in this case being formed directly on transparent conductor 6. In this embodiment the photoconductor is formed in strips 18, 19, 20 of the same width and length as electroluminescent strips 1, 2 and 3. Each of these photoconductive strips is made of a photoconductive material sensitive to the same color light as that produced by the electroluminescent strip opposite which it is located. For example, the strips 18 may be made of cadmium telluride (CdTe), which is sensitive to red light, the strips 19 may be made of aluminum arsenide (AlAs) which is sensitive to green light and the strips 20 may be made of zinc oxide (ZnO) which is sensitive to blue light. In other respects, FIG. 2 is similar to FIG. 1 and its operation is the same.

FIG. 3 is a light amplifier that permits the production of an amplified image from both the infrared and the visible light content of the incident image, or from either separately. The light amplifier is similar in its construction of FIG. 2 except that only red and green electroluminescent strips are used and these are controlled by photoconductive strips sensitive to infrared and visible light, respectively. Blue electroluminescent strips may be used in place of the green strips if desired. Accordingly, the photoconductive strips 22 are made of a photoconductive material sensitive to infrared radiation such as indium antimonide (InSb) and the photoconductive strips 23 are made of a photoconductive material having a broad response over the visible spectrum such as cadmium sulphide (CdS).

The operation is similar to that of FIG. 2. The conductivity of the elemental sections of strips 22 is directly related to the intensity of the infrared radiation in the corresponding elemental areas of the incident image formed on the conductor 6 side of the light amplifier by the optical system. As a result, the elemental sections of the electroluminescent strips 1 produce red light in direct relation to the conductivity of the corresponding elemental sections of strips 22. Therefore, with $S_2$ in the "*b*" position, an amplified red image is visible on the light amplifier corresponding to the infrared incident image. Similarly, with $S_2$ in the "*c*" position, the incident visible image acts through photoconductive strips 23 to produce an amplified green image corresponding to the corresponding incident visible light image. Both images may be observed simultaneously with $S_1$ in the "*a*" position. If the red and green electroluminescent phosphors given above are used for strips 1 and 2, $f_1$ may be 50 c./s. as before.

Light amplifiers of the above described type may be used in combination with optical systems of high light gathering ability for making observations at light levels below that at which the human eye can see and at wavelengths to which the eye is not sensitive. In military use, it is desirable to be able to compare observations of the same scene made in full color with observations made in the individual primary colors, as provided for in FIGS. 1, 1*a* and 2, and to compare observations made in the infrared region with observations made in the visible spectrum, as provided for in FIG. 3, since such comparisons can yield valuable military information. Other uses of the light amplifiers described are apparent. For example, the device in large scale size could be used to amplify projected television images. The television projector would be used to form a full size image on the incident image side of the light amplifier with the amplified image being viewed on the other side.

I claim:

1. A wavelength differentiating light amplifier in the form of a relatively thin plate one side of which constitutes an incident image surface for receiving an optical image to be amplified and the other side of which constitutes an image viewing surface toward which the amplified image may be viewed, said amplifier comprising a plurality of like groups of elements with each element in a group corresponding to a different wavelength range of the light in said incident image, each element comprising a first part situated adjacent to said image viewing surface and a second part situated adjacent to said incident image surface, said first part comprising an electroluminescent source of light in the corresponding wavelength range only and said second part having an electrical conductivity that is sensitive to light in the corresponding wavelength range only, and a source of electrical energization coupled to said first part through said second part.

2. Apparatus as claimed in claim 1 in which said first part contains an electroluminescent phosphor producing light only in the corresponding wavelength range of the element, and said second part contains a photoconductive material sensitive to light over a wide wavelength range and a filter for restricting the light reaching said photoconductor to the wavelength range of the element.

3. Apparatus as claimed in claim 1 in which said first part contains an electroluminescent phosphor producing light over a wide wavelength range and a filter for restricting the light output to the corresponding wavelength range of the element, and said second part contains a photoconductive material sensitive to light over a wide wavelength range and a filter for restricting the light reaching said photoconductor to the wavelength range of the element.

4. Apparatus as claimed in claim 1 in which said first part contains an electroluminescent phosphor producing light only in the corresponding wavelength range of the element, and said second part contains a photoconductive material sensitive only to light in the corresponding wavelength range of the element.

References Cited in the file of this patent

UNITED STATES PATENTS

| | | |
|---|---|---|
| 2,792,447 | Kazan | May 14, 1957 |
| 2,821,637 | Roberts et al. | Jan. 28, 1958 |
| 2,861,206 | Fiore et al. | Nov. 18, 1958 |

FOREIGN PATENTS

| | | |
|---|---|---|
| 157,101 | Australia | June 16, 1954 |